(12) United States Patent
Yoshida et al.

(10) Patent No.: US 11,437,189 B2
(45) Date of Patent: Sep. 6, 2022

(54) ELECTRONIC COMPONENT HAVING PLURALITY OF INTERNAL ELECTRODES

(71) Applicant: TDK CORPORATION, Tokyo (JP)

(72) Inventors: Daisuke Yoshida, Tokyo (JP); Hikaru Hirabayashi, Tokyo (JP); Yuki Takahashi, Tokyo (JP); Takuto Okamoto, Tokyo (JP); Masato Kimura, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/160,531

(22) Filed: Jan. 28, 2021

(65) Prior Publication Data

US 2021/0257160 A1    Aug. 19, 2021

(30) Foreign Application Priority Data

Feb. 13, 2020 (JP) .............................. JP2020-022427

(51) Int. Cl.
*H01G 4/012* (2006.01)
*H01G 4/008* (2006.01)
*H01G 4/12* (2006.01)
*H01G 4/232* (2006.01)
*H01G 4/30* (2006.01)

(52) U.S. Cl.
CPC .............. *H01G 4/012* (2013.01); *H01G 4/008* (2013.01); *H01G 4/1218* (2013.01); *H01G 4/232* (2013.01); *H01G 4/30* (2013.01)

(58) Field of Classification Search
CPC .......... H01G 4/012; H01G 4/008; H01G 4/30; H01G 4/224
See application file for complete search history.

(56) References Cited

U.S. PATENT DOCUMENTS

| | | | | |
|---|---|---|---|---|
| 2012/0194031 | A1* | 8/2012 | Ogawa .................. | H01G 4/005 336/200 |
| 2014/0307362 | A1* | 10/2014 | Kim ....................... | H01G 4/012 361/301.4 |
| 2014/0321025 | A1* | 10/2014 | Saito ...................... | C25D 5/617 205/181 |
| 2015/0021073 | A1* | 1/2015 | Kim ....................... | H01G 2/065 174/258 |

(Continued)

FOREIGN PATENT DOCUMENTS

| | | | |
|---|---|---|---|
| JP | H11191515 A | * | 7/1999 |
| JP | 2003-022930 A | | 1/2003 |

(Continued)

*Primary Examiner* — David M Sinclair
*Assistant Examiner* — Daniel M Dubuisson
(74) *Attorney, Agent, or Firm* — Oliff PLC

(57) ABSTRACT

A multilayer capacitor 1 includes an element body, an external electrode, and a plurality of internal electrodes. The plurality of internal electrodes include electrode portions disposed to face other internal electrodes and connecting portions connecting the electrode portions to the external electrode. The connecting portions of the internal electrodes are positioned in a region corresponding to an end surface when viewed from a direction perpendicular to the end surface. The electrode portions of the internal electrodes have portions overlapping a region corresponding to an edge line surfaces when viewed from the direction perpendicular to the end surface.

4 Claims, 7 Drawing Sheets

(56) References Cited

U.S. PATENT DOCUMENTS

| | | | | |
|---|---|---|---|---|
| 2015/0325377 A1* | 11/2015 | Takeuchi | ............... | H01G 4/012 |
| | | | | 361/301.4 |
| 2017/0011852 A1* | 1/2017 | Miyazaki | ............. | H01G 4/2325 |
| 2019/0164693 A1* | 5/2019 | Ono | ......................... | H01G 4/30 |
| 2019/0355518 A1* | 11/2019 | Harada | .................... | H01G 4/30 |
| 2019/0385793 A1* | 12/2019 | Wakashima | ............. | H01G 4/30 |
| 2020/0152391 A1* | 5/2020 | Kang | ...................... | H01G 4/30 |

FOREIGN PATENT DOCUMENTS

| | | | | |
|---|---|---|---|---|
| JP | 2011233696 | A | * | 11/2011 |
| JP | 2016025287 | A | * | 2/2016 |

* cited by examiner

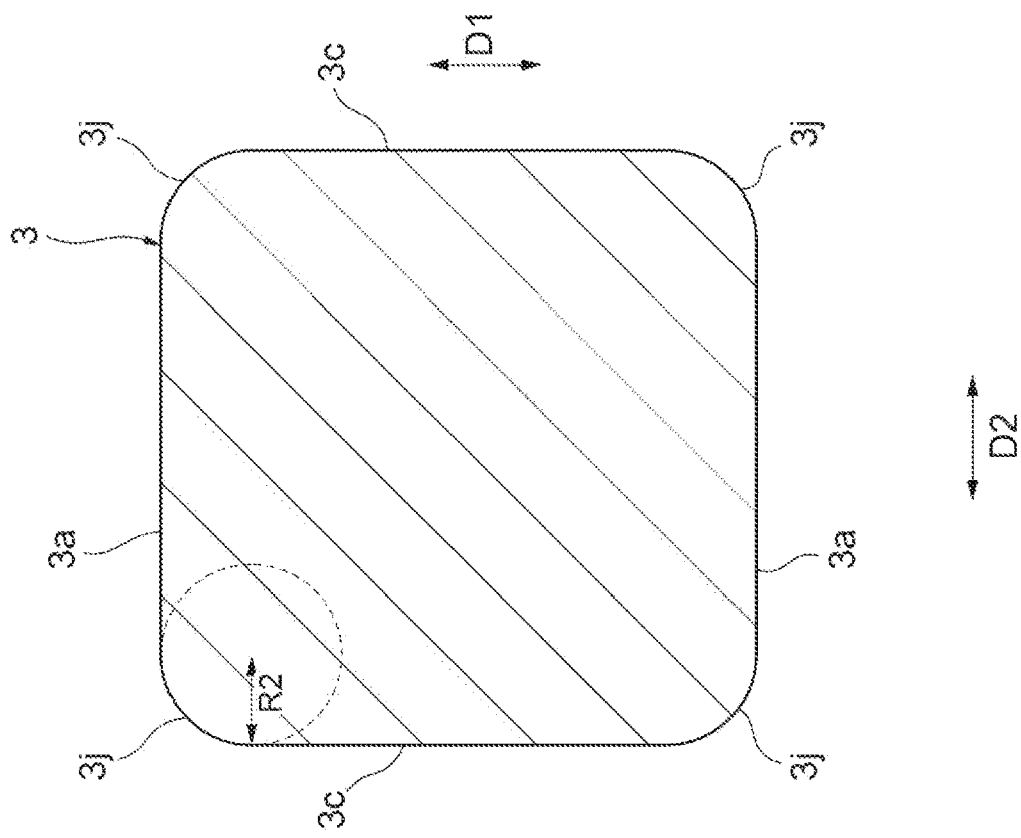
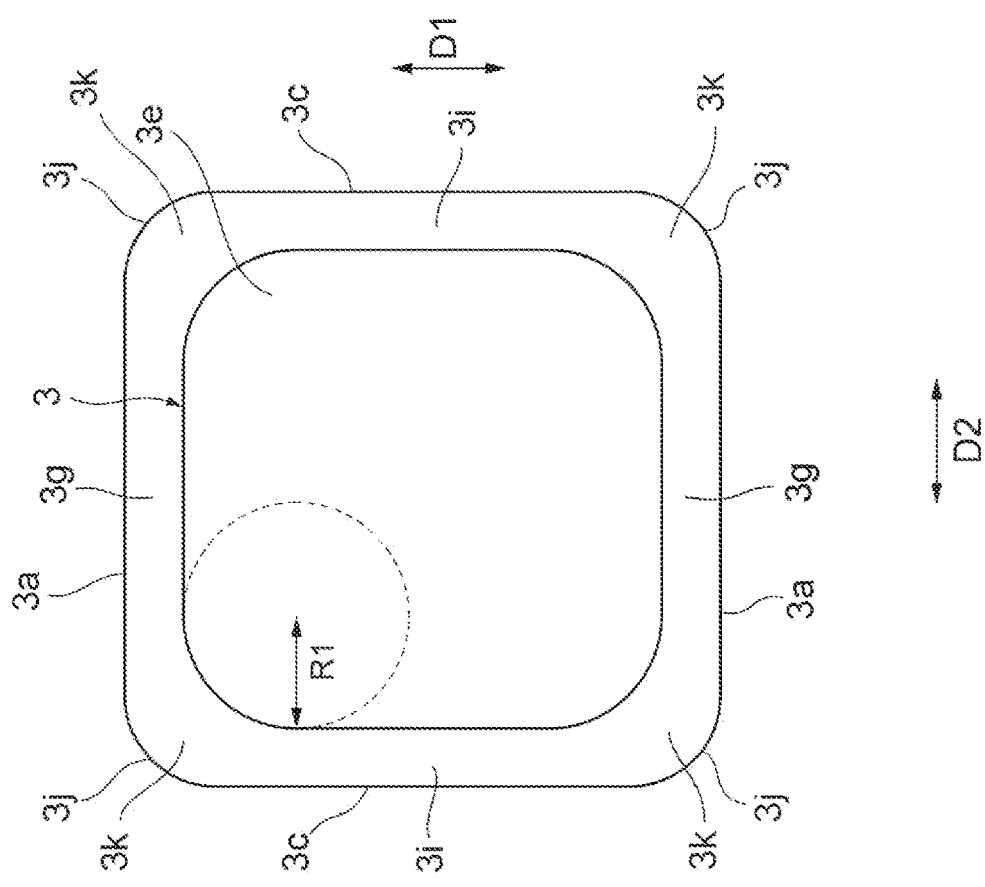

ELECTRONIC COMPONENT HAVING PLURALITY OF INTERNAL ELECTRODES

TECHNICAL FIELD

The present invention relates to an electronic component.

BACKGROUND

An electronic component including an element body including a side surface and an end surface adjacent to each other, an external electrode disposed on the side surface and the end surface, and an internal electrode disposed in the element body is known (for example, see Japanese Unexamined Patent Publication No. 2003-22930). The element body has a rectangular parallelepiped shape in which a corner portion and an edge line portion are rounded. The internal electrode has a rectangular shape and is exposed to the end surface of the element body to be connected to the external electrode.

SUMMARY

There is a likelihood that chipping (chipping) will occur in an element body, for example, during the manufacturing process. When element bodies collide with each other or when an element body collides with manufacturing equipment other than an element body, an impact is applied to the element body. Since a corner portion of the element body has a relatively low strength, there is a high likelihood that chipping will occur on the corner portion when an impact is applied. Therefore, occurrence of chipping in the element body is suppressed by forming a corner portion and an edge line portion of the element body into a curved surface shape.

An external electrode generally includes an electrode layer disposed on a side surface and an end surface, and a plated layer disposed to cover the electrode layer. The plated layer is formed on the electrode layer using a plating method. When the element body is immersed in a plating solution, the plating solution may enter an interface between the external electrode and the element body through the external electrode due to a pressure difference between the outside and inside of the external electrode (electrode layer). An end portion of an internal electrode is exposed to a surface of the element body to be connected to the external electrode. Therefore, the plating solution that has entered the interface between the external electrode and the element body may enter the inside of the element body through an interface between the end portion or an internal conductor of the internal electrode and the element body. Particularly, when the corner portion and the edge line portion of the element body have a curved surface shape, thicknesses of the external electrode at the corner portion and the edge line portion decrease, and this causes the plating solution to easily enter. Entering of the plating solution into the element body causes decrease in reliability of the electronic component. Also, increase in capacitance is desired in electronic components.

An objective of one aspect of the present invention is to provide an electronic component in which increase in capacitance can be achieved while achieving improvement in reliability.

An electronic component according to one aspect of the present invention includes an element body having a pair of end surfaces facing each other and four side surfaces connecting the pair of end surfaces, an external electrode disposed on the side surfaces and each of the end surfaces, and a plurality of internal electrodes disposed in the element body, in which the element body has a first edge line surface which is provided between the end surface and each of the side surfaces and which is curved, and a second edge line surface which is provided between two adjacent side surfaces and which is curved, the external electrode has an electrode layer provided across the end surface and a part of the side surface and a plated layer covering the electrode layer, the plurality of internal electrodes each have an electrode portion disposed to face other internal electrodes and a connecting portion connecting the electrode portion and the external electrode, the connecting portions of the internal electrodes are positioned in a region corresponding to the end surface when viewed from a direction perpendicular to the end surface, and the electrode portions of the internal electrodes have portions overlapping a region corresponding to the first edge line surface when viewed from the direction perpendicular to the end surface.

In the electronic component according to one aspect of the present invention, the connecting portions of the internal electrodes are positioned in the region corresponding to the end surface when viewed from a direction perpendicular to the end surface. That is, the connecting portions of the internal electrodes are not positioned in the region corresponding to the first edge line surface when viewed from the direction perpendicular to the end surface. Thereby, in the electronic component, entering of a plating solution into the element body via the connecting portions of the internal electrodes can be suppressed in a plating process of forming the plated layer of the external electrode. Therefore, improvement in reliability can be achieved in the electronic component. On the other hand, in the electronic component, the electrode portions of the internal electrodes have portions overlapping the region of the first edge line surface when viewed from the direction perpendicular to the end surface. Thereby, areas of the electrode portions can be increased in the electronic component. Therefore, increase in capacitance can be achieved in the electronic component.

In one embodiment, a radius of curvature of a corner portion of the element body may be larger than a radius of curvature of the second edge line surface. In this configuration, occurrence of chipping in the element body can be further suppressed.

In one embodiment, all the connecting portions of the plurality of internal electrodes may be positioned in the region corresponding to the end surface when viewed from the direction perpendicular to the end surface. In this configuration, all the connecting portions are not positioned in the region corresponding to the first edge line surface when viewed from the direction perpendicular to the end surface. Therefore, in the electronic component, entering of the plating solution into the element body via the connecting portions of the internal electrodes can be further suppressed in the plating process of forming the plated layer of the external electrode.

In one embodiment, the electrode portions of two internal electrodes disposed at end portions in a lamination direction of the plurality of internal electrodes may have portions overlapping the region corresponding to the first edge line surface at positions facing each other in the lamination direction. In this configuration, since the areas of the electrode portions of the internal electrodes can be increased, the capacitance can be increased.

In one embodiment, all the electrode portions of the plurality of internal electrodes may have portions overlapping the region corresponding to the first edge line surface when viewed from the direction perpendicular to the end surface. In this configuration, since the areas of all the electrode portions of the internal electrodes can be increased, the capacitance can be further increased.

In one embodiment, a width of the connecting portion may be smaller than a width of the electrode portion. In this configuration, the capacitance can be increased while suppressing entering of the plating solution.

In one embodiment, both end portions in a direction in which a pair of side surfaces parallel to the lamination direction face each other in the electrode portions of the two internal electrodes disposed at the end portions in the lamination direction of the plurality of internal electrodes may have portions overlapping the region corresponding to the first edge line surface when viewed from the direction perpendicular to the end surface. In this configuration, since the areas of the electrode portions of the internal electrodes can be increased, the capacitance can be increased.

In one embodiment, central portions in the direction in which the pair of side surfaces parallel to the lamination direction face each other in the electrode portions of the two internal electrodes disposed at the end portions in the lamination direction of the plurality of internal electrodes may be positioned in the region corresponding to the end surface when viewed from the direction perpendicular to the end surface. In this configuration, the capacitance can be increased while suppressing entering of the plating solution.

According to one aspect of the present invention, improvement in reliability can be achieved.

BRIEF DESCRIPTION OF THE DRAWINGS

FIG. 7A is a view illustrating the element body.

FIG. 7B is a view illustrating a cross-sectional configuration of the element body.

DETAILED DESCRIPTION

Hereinafter, a preferred embodiment of the present invention will be described in detail with reference to the accompanying drawings. In the description of the drawings, the same elements or elements having the same functions will be denoted by the same reference signs and duplicate descriptions thereof will be omitted.

Figure 1:
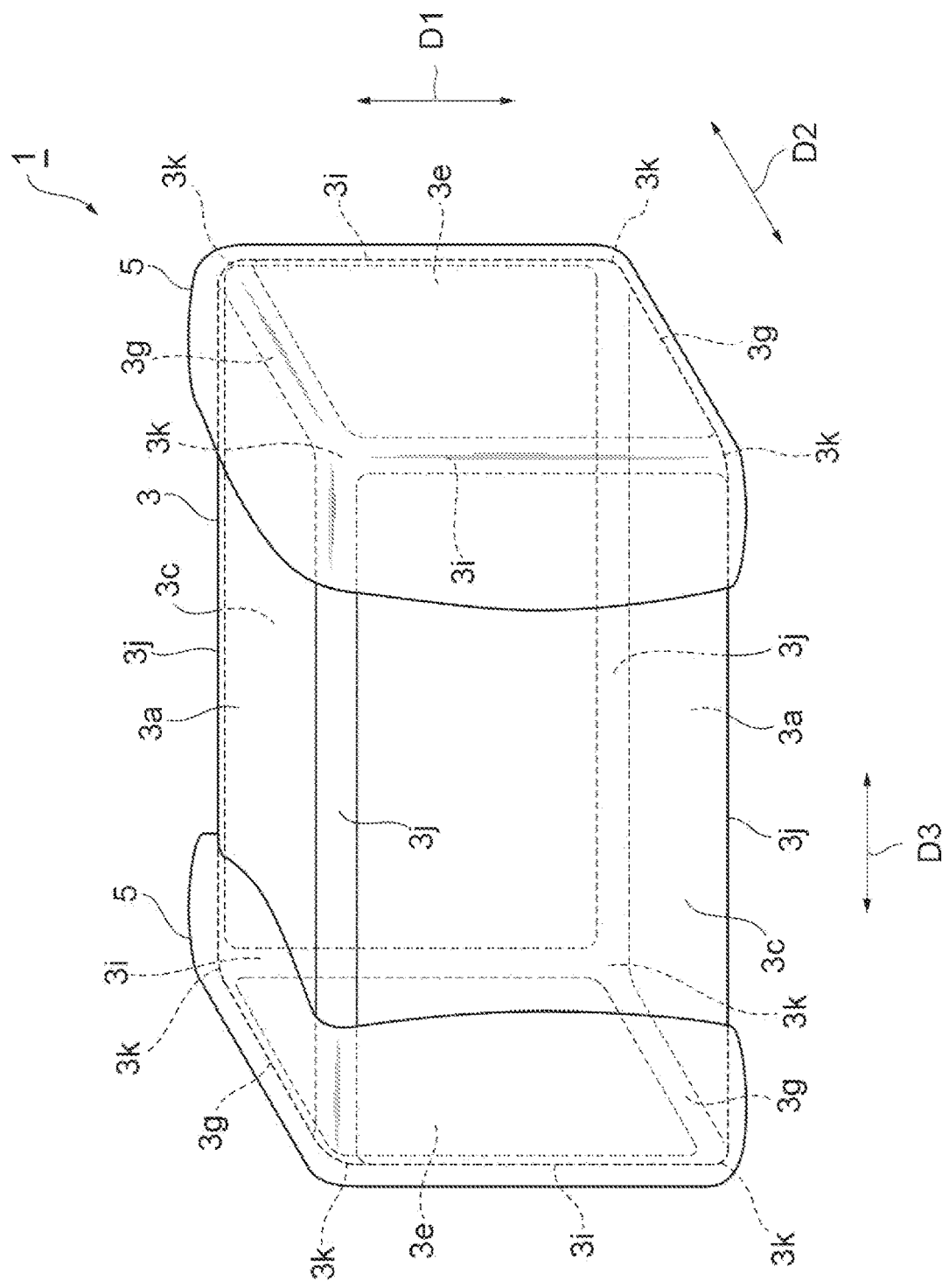
FIG. 1 is a perspective view of a multilayer capacitor according to the present embodiment.

As illustrated in FIG. 1, a multilayer capacitor (electronic component) 1 includes an element body 3 having a rectangular parallelepiped shape and a plurality of external electrodes 5. In the present embodiment, the multilayer capacitor 1 includes a pair of external electrodes 5. The pair of external electrodes 5 are disposed on an outer surface of the element body 3. The pair of external electrodes 5 are spaced apart from each other. The rectangular parallelepiped shape includes a rectangular parallelepiped shape in which corner portions and edge line portions are chamfered, and a rectangular parallelepiped shape in which corner portions and edge line portions are rounded.

The element body 3 includes a pair of main surfaces 3a facing each other, a pair of side surfaces 3c facing each other, and a pair of end surfaces 3e facing each other. The pair of main surfaces 3a, the pair of side surfaces 3c, and the pair of end surfaces 3e have a rectangular shape. The rectangular shape may include, for example, a shape in which each corner is curved, that is, a shape in which each corner is chamfered, and a shape in which each corner is rounded.

A direction in which the pair of main surfaces 3a face each other is a first direction D1. A direction in which the pair of side surfaces 3c face each other is a second direction D2. A direction in which the pair of end surfaces 3e face each other is a third direction D3. The multilayer capacitor 1 is solder-mounted on an electronic device. The electronic device may include, for example, circuit boards or electronic components. In the multilayer capacitor 1, one main surface 3a faces the electronic device. One main surface 3a is disposed to form a mounting surface. One main surface 3a is a mounting surface. Each of the main surfaces 3a is also a side surface of the element body 3 having a rectangular parallelepiped shape.

The first direction D1 is a direction perpendicular to the main surfaces 3a and is perpendicular to the second direction D2. The third direction D3 is a direction parallel to the main surfaces 3a and the side surfaces 3c and is perpendicular to the first direction D1 and the second direction D2. The second direction D2 is a direction perpendicular to the side surfaces 3c, and the third direction D3 is a direction perpendicular to the end surfaces 3e. In the present embodiment, a length of the element body 3 in the first direction D1 is larger than a length of the element body 3 in the second direction D2. A length of the element body 3 in the third direction D3 is larger than the length of the element body 3 in the first direction D1 and larger than the length of the element body 3 in the second direction D2. The third direction D3 is a longitudinal direction of the element body 3.

The length of the element body 3 in the first direction D1 is a height of the element body 3. The length of the element body 3 in the second direction D2 is a width of the element body 3. The length of the element body 3 in the third direction D3 is a length of the element body 3. In the present embodiment, for example, the height of the element body 3 may be 1880 μm, the width of the element body 3 may be 1840 μm, and the length of the element body 3 may be 3330 μm. The multilayer capacitor 1 is a so-called C3216 type product.

The pair of side surfaces 3c extend in the first direction D1 to connect the pair of main surfaces 3a. The pair of side surfaces 3c also extend in the third direction D3. The pair of end surfaces 3e extend in the first direction D1 to connect the pair of main surfaces 3a. The pair of end surfaces 3e also extend in the second direction D2.

The element body 3 includes four edge line surfaces (first edge line surface) 3g, four edge line surfaces (first edge line surface) 3i, and four edge line surfaces (second edge line surface) 3j. The edge line surfaces 3g are each positioned between the end surface 3e and the main surface 3a. The edge line surfaces 3i are each positioned between the end surface 3e and the side surface 3c. The edge line surfaces 3j are each positioned between the main surface 3a and the side surface 3c. In the present embodiment, the edge line surfaces 3g, 3i, and 3j are each rounded to be curved in a convex shape. The edge line surfaces 3g, 3i, and 3j are each a curved surface having a predetermined radius of curvature. The element body 3 has been subjected to so-called R chamfering. The end surface 3e and the main surface 3a are indirectly adjacent to each other via the edge line surface 3g. The end surface 3e and the side surface 3c are indirectly adjacent to each other via the edge line surface 3i. The main surface 3a and the side surface 3c are indirectly adjacent to each other via the edge line surface 3j.

The element body 3 includes corner portions 3k. The corner portions 3k are each rounded to be curved. That is, each corner portion 3k has a curved surface shape. The corner portion 3k is an intersecting portion of the edge line surface 3g and the edge line surface 3i. That is, the edge line surface 3g and the edge line surface 3i form the corner portion 3k.

Figure 4:
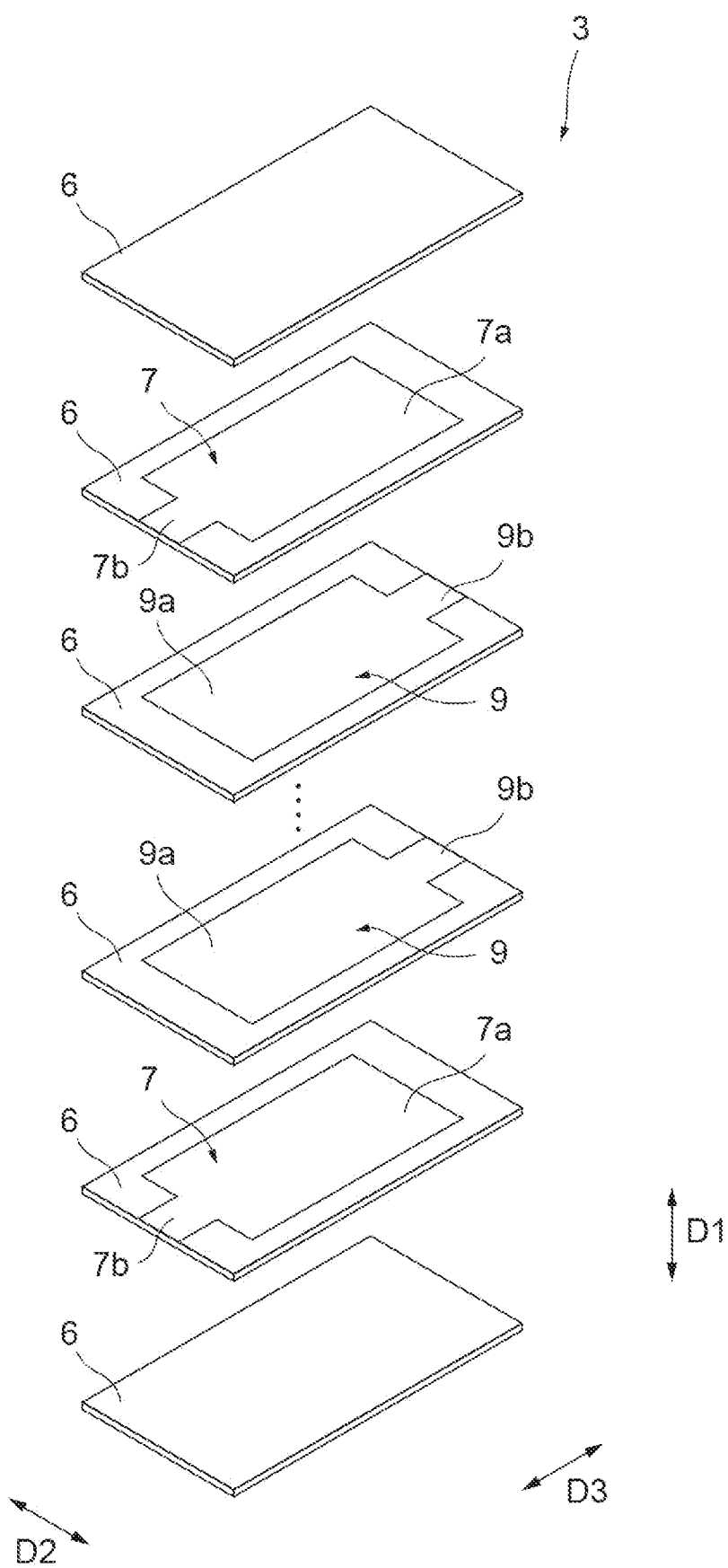
FIG. 4 is an exploded perspective view of an element body of the multilayer capacitor.

As illustrated in FIG. 4, the element body 3 is configured to have a plurality of dielectric layers 6 laminated in the first direction D1. The element body 3 includes the plurality of laminated dielectric layers 6. In the element body 3, a lamination direction of the plurality of dielectric layers 6 coincides with the first direction D1. Each of the dielectric layers 6 may be formed of, for example, a sintered body of a ceramic green sheet containing a dielectric material. The dielectric material may include, for example, a $BaTiO_3$-based dielectric ceramic, a $Ba(Ti, Zr)O_3$-based dielectric ceramic, a $(Ba, Ca)TiO_3$-based dielectric ceramic, or the like. In an actual element body 3, the dielectric layers 6 are integrated to such an extent that boundaries between the respective dielectric layers 6 cannot be visually recognized.

Figure 2:
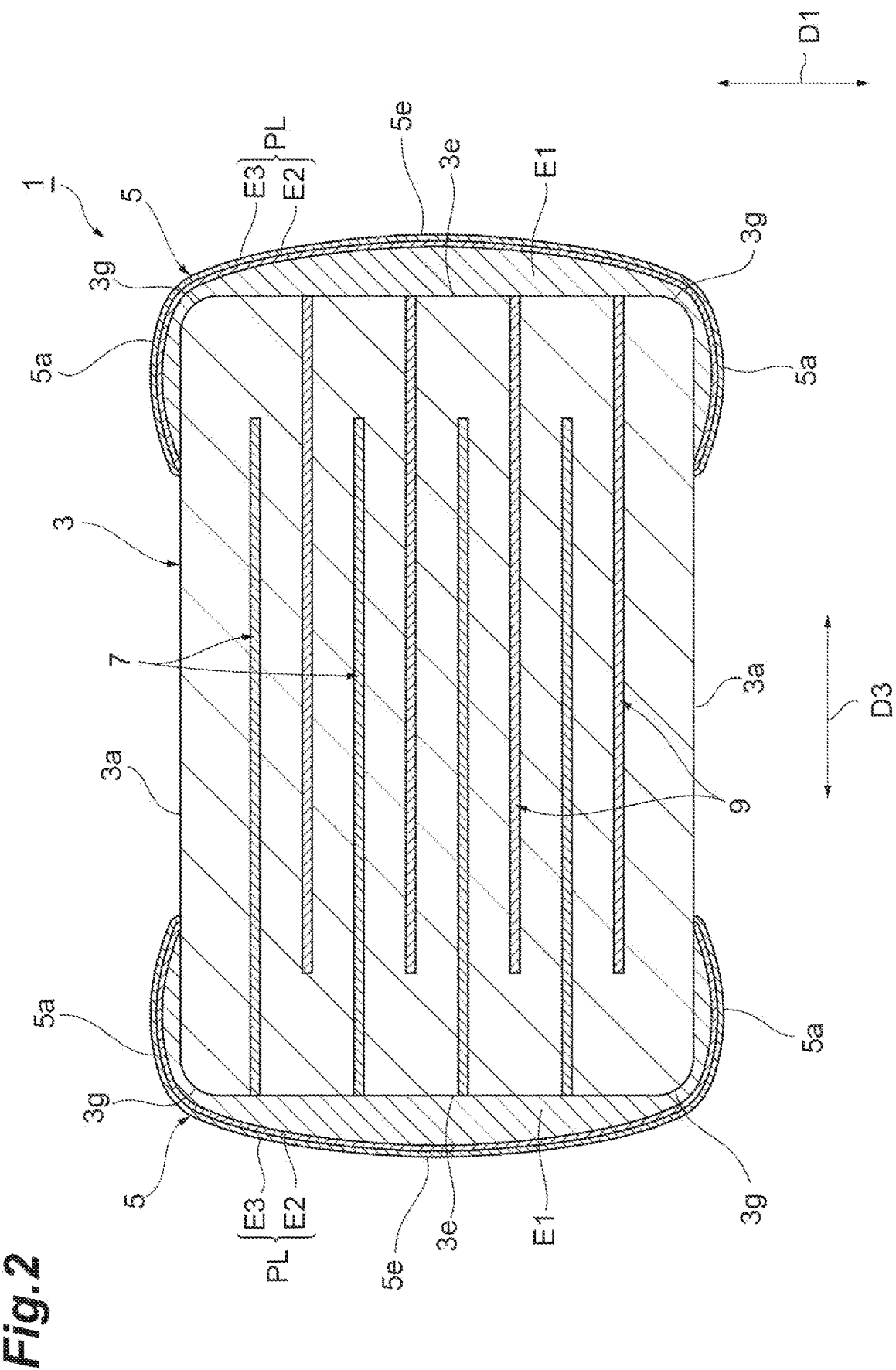
FIG. 2 is a view illustrating a cross-sectional configuration of the multilayer capacitor according to the present embodiment.
Figure 3:
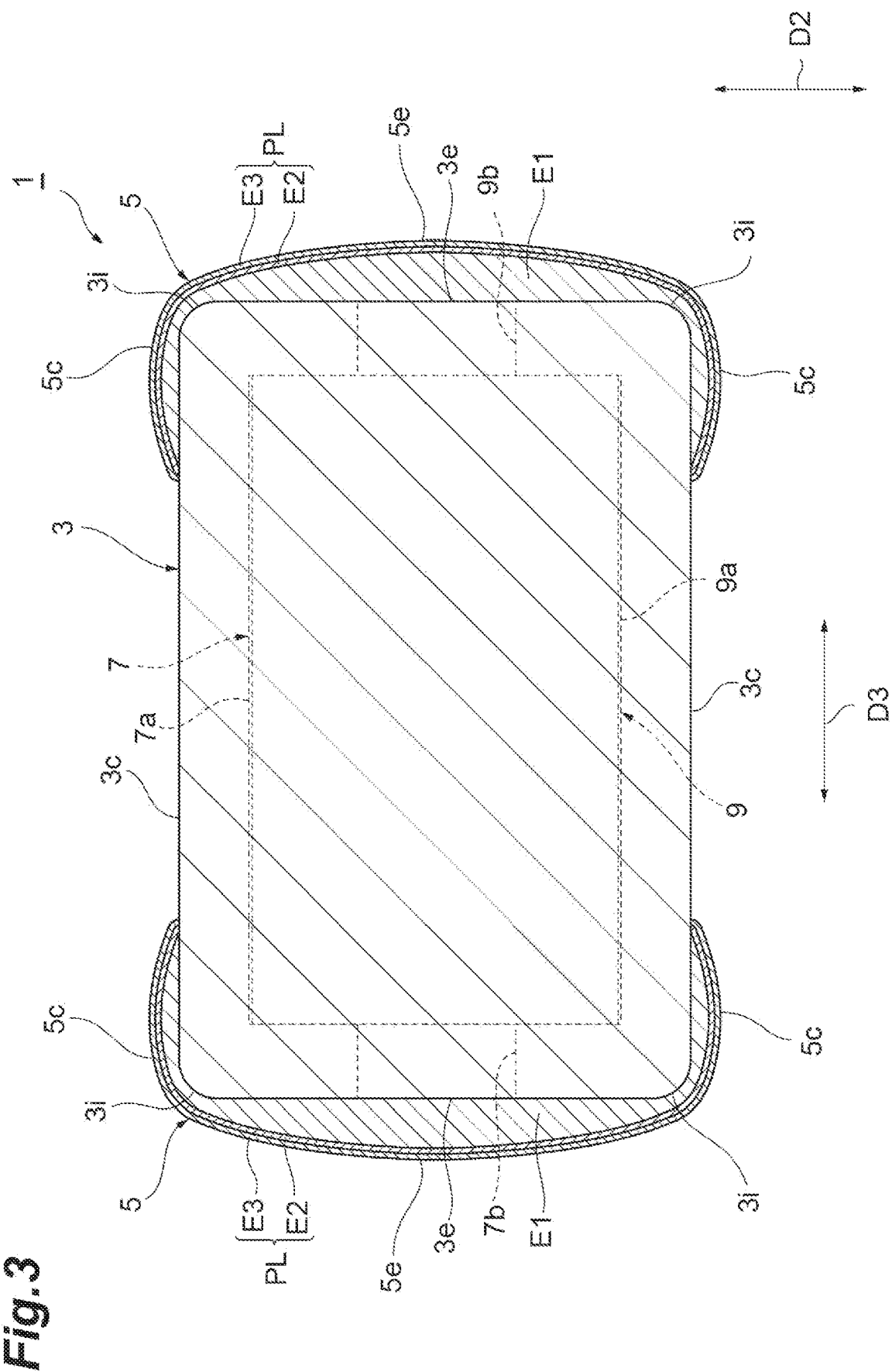
FIG. 3 is a view illustrating a cross-sectional configuration of the multilayer capacitor according to the present embodiment.

As illustrated in FIGS. 2 and 3, the multilayer capacitor 1 includes a plurality of internal electrodes 7 and a plurality of internal electrodes 9. In the present embodiment, the multilayer capacitor 1 includes four internal electrodes 7 and four internal electrodes 9. Each of the internal electrodes 7 and 9 is an internal conductor disposed in the element body 3. Each of the internal electrodes 7 and 9 is made of a conductive material normally used for internal electrodes of lamination-type electronic components. The conductive material may include, for example, a base metal. The conductive material may include, for example, Ni or Cu. The internal electrodes 7 and 9 are formed as a sintered body of a conductive paste containing the above-described conductive material.

The internal electrodes 7 and the internal electrodes 9 are disposed at different positions (layers) in the first direction D1. In the element body 3, the internal electrodes 7 and the internal electrodes 9 are alternately disposed to face each other with a distance therebetween in the first direction D1. The internal electrode 7 and the internal electrode 9 have different polarities from each other.

The plurality of internal electrodes 7 and the plurality of internal electrodes 9 are alternately aligned in the first direction D1. The internal electrodes 7 and 9 are each positioned in a plane that is substantially parallel to the main surfaces 3a. The internal electrodes 7 and the internal electrodes 9 face each other in the first direction D1. A direction in which the internal electrodes 7 and the internal electrodes 9 face each other (the first direction D1) is perpendicular to a direction parallel to the main surfaces 3a (the second direction D2 and the third direction D3). In the present embodiment, a distance between the internal electrode 7 closest to one main surface 3a and the internal electrode 9 closest to the other main surface 3a may be, for example, 1500 μm.

Figure 5:
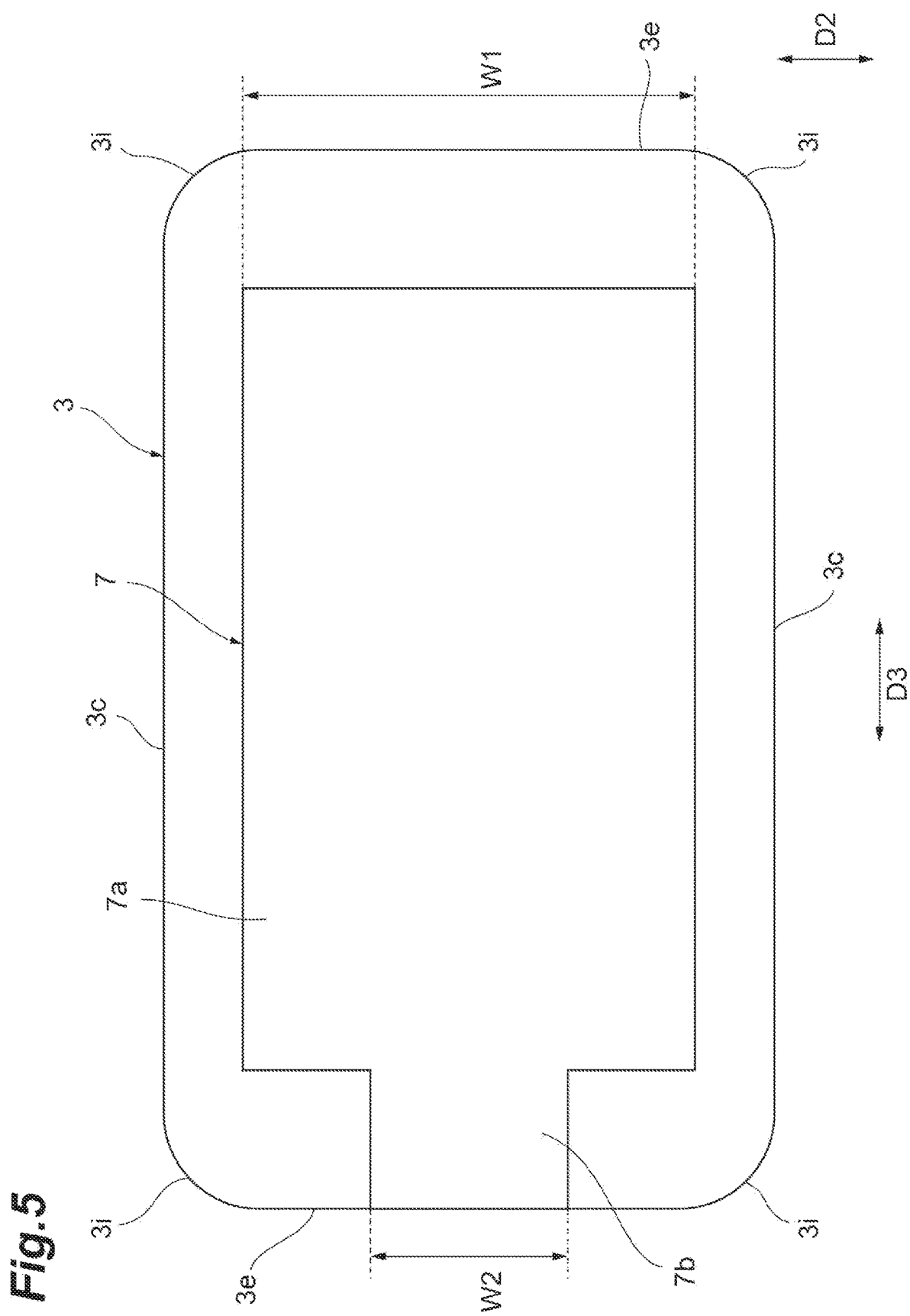
FIG. 5 is a view illustrating a configuration of an internal electrode.

As illustrated in FIGS. 4 and 5, the internal electrodes 7 each include an electrode portion 7a and a connecting portion 7b. The electrode portion 7a has a rectangular shape. The connecting portion 7b has a rectangular shape. The connecting portion 7b extends from one side of the electrode portion 7a and is exposed to corresponding one end surface 3e. The connecting portion 7b extends from one side of the electrode portion 7a on one end surface 3e side so that a central portion of the connecting portion 7b in the second direction D2 and a central portion of the electrode portion 7a in the second direction D2 are substantially coincident with each other. The connecting portion 7b of the internal electrode 7 exposed to one end surface 3e is joined to the external electrode 5. The connecting portion 7b connects the electrode portion 7a and the external electrode 5. Thereby, the internal electrode 7 is electrically connected to the external electrode 5.

As illustrated in FIG. 5, in the internal electrode 7, a width W1 of the electrode portion 7a in the second direction D2 is larger than a width W2 of the connecting portion 7b. In other words, the width W2 of the connecting portion 7b is smaller than the width W1 of the electrode portion 7a. In the present embodiment, for example, the width W1 of the electrode portion 7a may be 1500 μm, and the width W2 of the connecting portion 7b may be 750 μm. That is, the width W1 of the electrode portion 7a is twice the width W2 of the connecting portion 7b. For example, a length of the electrode portion 7a in the third direction D3 may be 2990 μm, and a length of the connecting portion 7b in the third direction D3 may be 170 μm.

As illustrated in FIG. 4, the internal electrode 9 includes an electrode portion 9a and a connecting portion 9b. The electrode portion 9a has a rectangular shape. The connecting portion 9b has a rectangular shape. The connecting portion 9b extends from one side of the electrode portion 9a and is exposed to the corresponding other end surface 3e. The connecting portion 9b extends from one side of the electrode portion 9a on the other end surface 3e side so that a central portion of the connecting portion 9b in the second direction D2 and a central portion of the electrode portion 9a in the second direction D2 are substantially coincident with each other. The connecting portion 9b of the internal electrode 9 exposed to the other end surface 3e is joined to the external electrode 5. The connecting portion 9b connects the electrode portion 9a and the external electrode 5. Thereby, the internal electrode 9 is electrically connected to the external electrode 5.

In the internal electrode 9, a width W1 of the electrode portion 9a in the second direction D2 is larger than a width W2 of the connecting portion 9b. In other words, the width W2 of the connecting portion 9b is smaller than the width W1 of the electrode portion 9a. In the present embodiment, for example, the width W1 of the electrode portion 9a may be 1500 μm, and the width W2 of the connecting portion 9b may be 750 μm. That is, the width W1 of the electrode portion 9a is twice the width W2 of the connecting portion 9b. For example, a length of the electrode portion 9a in the third direction D3 may be 2990 μm, and a length of the connecting portion 9b in the third direction D3 may be 170 μm.

As illustrated in FIG. 1, the external electrodes 5 are disposed at both end portions of the element body 3 in the third direction D3. The external electrodes 5 are respectively disposed on corresponding end surface 3e sides of the element body 3. The external electrodes 5 are each disposed on the pair of main surfaces 3a, the pair of side surfaces 3c, and one end surface 3e. The external electrode 5 includes a plurality of electrode portions 5a, 5c, and 5e as illustrated in FIGS. 2 and 3. The electrode portion 5a is disposed on the main surface 3a and the edge line surface 3g. The electrode portion 5c is disposed on the side surface 3c and the edge line surface 3i. The electrode portion 5e is disposed on the end surface 3e. The external electrode 5 also includes an electrode portion disposed on the edge line surface 3j.

The external electrode 5 is formed on five surfaces of the pair of main surfaces 3a, one end surface 3e, and the pair of side surfaces 3c, and on the edge line surfaces 3g, 3i, and 3j. The electrode portions 5a, 5c, and 5e adjacent to each other are connected and electrically connected. The electrode portion 5e covers all of one ends of corresponding internal electrodes 7 and 9. The electrode portion 5e is directly connected to the corresponding internal electrodes 7 and 9. The external electrode 5 is electrically connected to the corresponding internal electrodes 7 and 9. The external electrode 5 includes a first electrode layer E1, a second electrode layer E2, and a third electrode layer E3. The third electrode layer E3 constitutes an outermost layer of the external electrode 5. The electrode portions 5a, 5c, and 5e each have the first electrode layer E1, the second electrode layer E2, and the third electrode layer E3.

The first electrode layer E1 is disposed on a part of the main surface 3a, a part of the side surface 3c, and the end surface 3e. A part of the main surface 3a and a part of the side surface 3c may be, for example, parts of the main surface 3a and the side surface 3c that are close to the end surface 3e. The first electrode layer E1 is formed to cover the edge line surfaces 3g, 3i, and 3j. The first electrode layer E1 is formed to cover the entire edge line surface 3g and edge line surface 3i. The first electrode layer E1 is in contact with the entire edge line surface 3g and edge line surface 3i.

The first electrode layer E1 is formed by baking a conductive paste applied to a surface of the element body 3. The first electrode layer E1 is formed when a metal component (metal powder) contained in the conductive paste is sintered. The first electrode layer E1 is a sintered metal layer (electrode layer). The first electrode layer E1 is a sintered metal layer formed on the element body 3. In the present embodiment, the first electrode layer E1 is a sintered metal layer made of Cu. The first electrode layer E1 may also be a sintered metal layer made of Ni. The first electrode layer E1 contains a base metal. The conductive paste may contain, for example, a powder made of Cu or Ni, a glass component, an organic binder, and an organic solvent. Each first electrode layer E1 included in the electrode portions 5a, 5c, and 5e are integrally formed.

The second electrode layer E2 is disposed on the first electrode layer E1. The second electrode layer E2 covers the entire first electrode layer E1. The second electrode layer E2 is in contact with the entire first electrode layer E1. The second electrode layer E2 is in contact with a part of the main surface 3a and a part of the side surface 3c. The second electrode layer E2 is formed on the first electrode layer E1 using a plating method. In the present embodiment, the second electrode layer E2 is formed on the first electrode layer E1 by Ni plating. The second electrode layer E2 is a Ni-plated layer. The second electrode layer E2 may also be a Sn-plated layer, a Cu-plated layer, or an Au-plated layer. The second electrode layer E2 contains Ni, Sn, Cu, or Au. The Ni-plated layer is superior in solder corrosion resistance to the metal contained in the first electrode layer E1.

The third electrode layer E3 is disposed on the second electrode layer E2. The third electrode layer E3 covers the entire second electrode layer E2. The third electrode layer E3 is in contact with the entire second electrode layer E2. The third electrode layer E3 is in contact with a part of the main surface 3a and a part of the side surface 3c. The third electrode layer E3 is formed on the second electrode layer E2 using a plating method. The third electrode layer E3 is a solder-plated layer. In the present embodiment, the third electrode layer E3 is formed on the second electrode layer E2 by Sn plating. The third electrode layer E3 is a Sn-plated layer. The third electrode layer E3 may also be a Sn—Ag alloy plated layer, a Sn—Bi alloy plated layer, or a Sn—Cu alloy plated layer. The third electrode layer E3 contains Sn, a Sn—Ag alloy, a Sn—Bi alloy, or a Sn—Cu alloy.

The second electrode layer E2 and the third electrode layer E3 form a plated layer PL. In the present embodiment, the plated layer PL has a two-layer structure. The plated layer PL covers the first electrode layer E1. Each second electrode layer E2 included in the electrode portions 5a, 5c, and 5e are integrally formed. Each third electrode layer E3 included in the electrode portions 5a, 5c, and 5e are integrally formed.

Figure 6A:
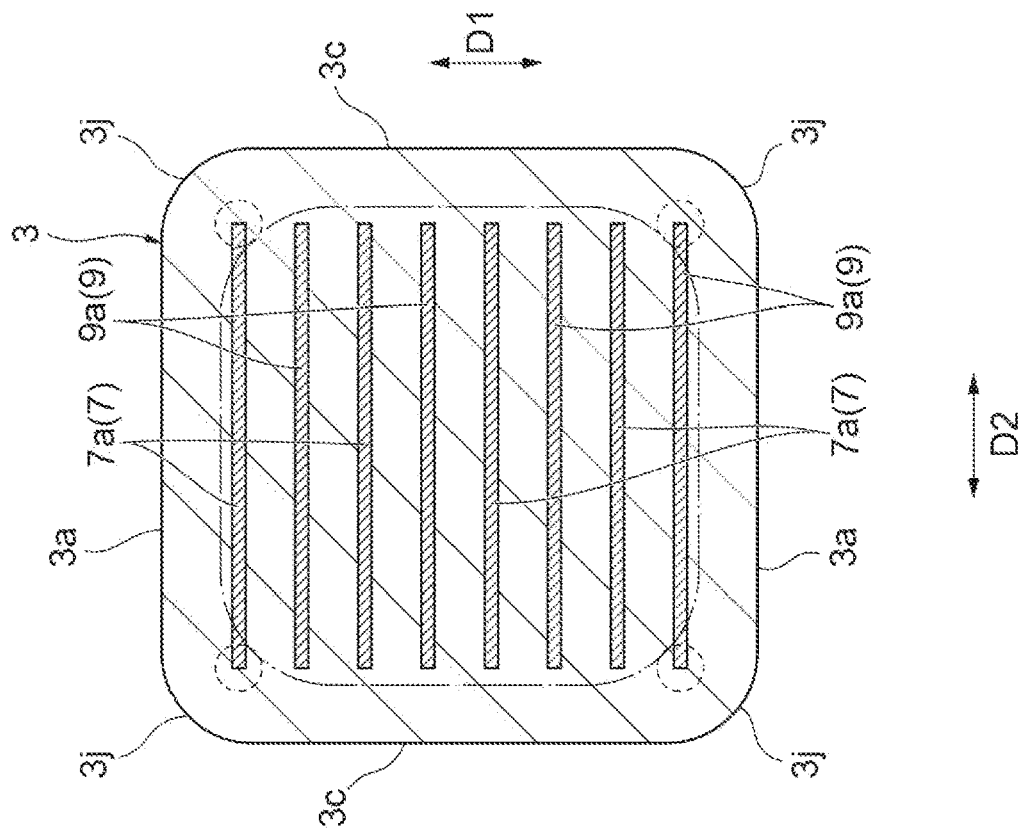
FIG. 6A is a view illustrating the element body.

As illustrated in FIG. 6A, the connecting portion 7b of the internal electrode 7 is positioned in a region corresponding to one end surface 3e when viewed from the direction in which the pair of end surfaces 3e face each other (the third direction D3). In the present embodiment, all the connecting portions 7b of the internal electrodes 7 are positioned in the region corresponding to one end surface 3e when viewed from the third direction D3. The connecting portions 7b are exposed only to the end surface 3e. The region corresponding to the end surface 3e is a region surrounded by the edge line surface 3g and the edge line surface 3i. The region corresponding to the end surface 3e has a rectangular shape in which corners thereof are curved. The region corresponding to the end surface 3e is defined by a boundary of the end surface 3e with the edge line surface 3g and the edge line surface 3i (edge of the end surface 3e). The connecting portions 7b of the internal electrodes 7 are disposed at positions at which they overlap only the end surface 3e when viewed from the third direction D3. The connecting portions 7b of the internal electrodes 7 are not disposed at positions overlapping the edge line surface 3g and the edge line surface 3i when viewed from the third direction D3. In FIG. 6A, illustration of the external electrode 5 is omitted.

The connecting portion 9b of the internal electrode 9 is positioned in a region corresponding to the other end surface 3e when viewed from the direction in which the pair of end surfaces 3e face each other (the third direction D3). In the present embodiment, all the connecting portions 9b of the internal electrodes 9 are positioned in the region corresponding to the other end surface 3e when viewed from the third direction D3. The connecting portions 9b are exposed only to the end surface 3e. The region corresponding to the end surface 3e is a region surrounded by the edge line surface 3g and the edge line surface 3i. The region corresponding to the end surface 3e has a rectangular shape in which corners thereof are curved. The region corresponding to the end surface 3e is defined by a boundary of the end surface 3e with the edge line surface 3g and the edge line surface 3i. The connecting portions 9b of the internal electrodes 9 are disposed at positions at which they overlap only the end surface 3e when viewed from the third direction D3. The connecting portions 9b of the internal electrodes 9 are not disposed at positions overlapping the edge line surface 3g and the edge line surface 3i when viewed from the third direction D3.

Figure 6B:
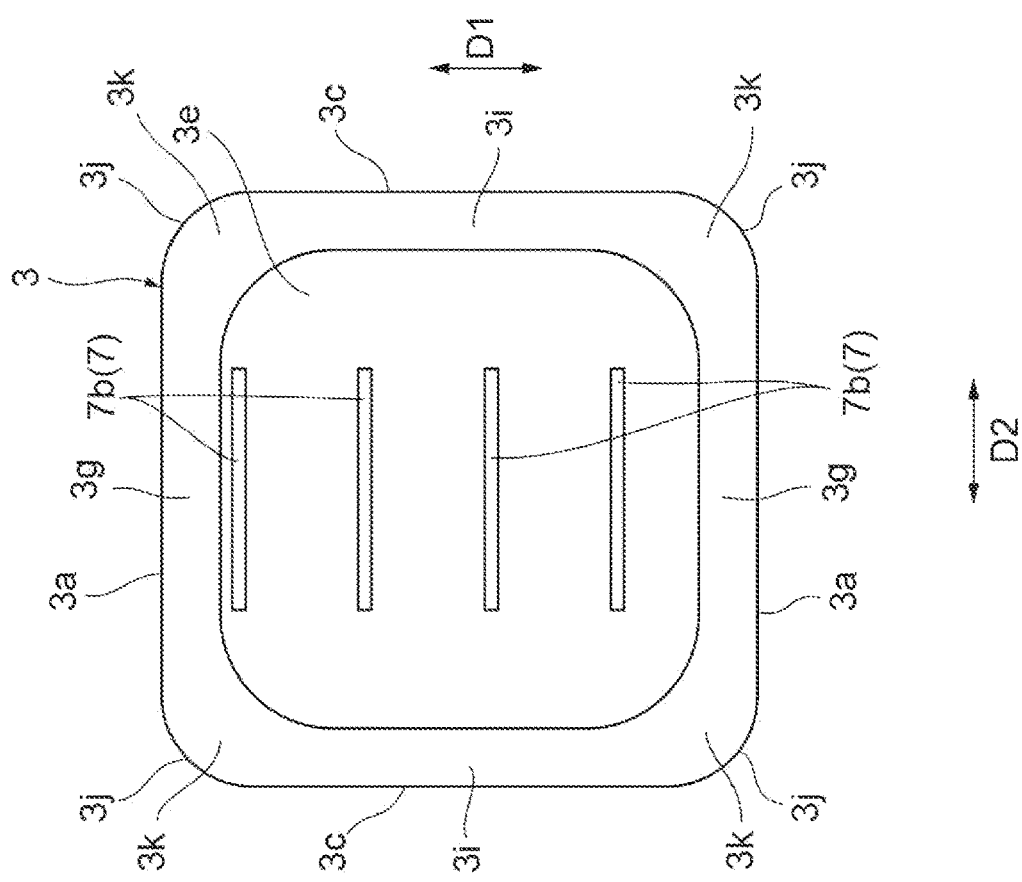
FIG. 6B is a view illustrating a cross-sectional configuration of the element body.

As illustrated in FIG. 6B, the electrode portions 7a and 9a of two internal electrodes 7 and 9 disposed at end portions in the first direction D1 have portions overlapping a region corresponding to the edge line surface 3j and the edge line surface 3i. Specifically, both end portions in the second direction D2 of the electrode portion 7a of the internal electrode 7 that is closest to one main surface 3a in the first direction D1 (portions surrounded by a broken-line circle) are positioned at regions corresponding to an intersecting portion of the edge line surface 3j and the edge line surface 3i when viewed from the third direction D3. That is, both end portions of the electrode portion 7a of the internal electrode 7 in the second direction D2 described above are disposed at positions that do not overlap the region corresponding to the end surface 3e (a region indicated by a dashed-dotted line) when viewed from the third direction D3. Both end portions in the second direction D2 of the electrode portion 7a of the internal electrode 7 described above protrude in the second direction D2 from the region corresponding to the end surface 3e when viewed from the third direction D3. Further, FIG. 6B illustrates a cross section at a position that is ½ of the length of the element body 3. Therefore, the edge line surface 3j in FIG. 6B indicates an edge line surface at a position that is ½ of the length of the element body 3.

Both end portions in the second direction D2 of the electrode portion 9a of the internal electrode 9 that is closest to the other main surface 3a in the first direction D1 (portions surrounded by a broken-line circle) are positioned at regions corresponding to an intersecting portion of the edge line surface 3j and the edge line surface 3i when viewed from the third direction D3. That is, both end portions in the second direction D2 of the electrode portion 9a of the internal electrode 9 described above are disposed at positions that do not overlap the region corresponding to the end surface 3e when viewed from the third direction D3. Both end portions in the second direction D2 of the electrode portion 9a of the internal electrode 9 described above protrude in the second direction D2 from the region corresponding to the end surface 3e when viewed from the third direction D3.

A central portion in the second direction D2 of the electrode portion 7a of the internal electrode 7 that is closest to one main surface 3a in the first direction D1 is positioned in the region corresponding to the end surface 3e when viewed from the third direction D3. That is, the central portion of the electrode portion 7a of the internal electrode 7 in the second direction D2 described above is disposed at a position that does not overlap the edge line surface 3j or the edge line surface 3i when viewed from the third direction D3. A central portion in the second direction D2 of the electrode portion 9a of the internal electrode 9 that is closest to the other main surface 3a in the first direction D1 is positioned in the region corresponding to the end surface 3e when viewed from the third direction D3. That is, the central portion of the electrode portion 9a of the internal electrode 9 in the second direction D2 described above is disposed at a position that does not overlap the edge line surface 3j or the edge line surface 3i when viewed from the third direction D3.

As illustrated in FIGS. 7A and 7B, a radius of curvature R1 of the corner portion 3k of the element body 3 is larger than a radius of curvature R2 of the edge line surface 3j (R1>R2). In other words, the radius of curvature R2 of the edge line surface 3j is smaller than the radius of curvature R1 of the corner portion 3k of the element body 3 (R2<R1). In the present embodiment, the radius of curvature R1 is 140 μm to 160 μm. For example, the radius of curvature R1 may be 150 μm and the radius of curvature R2 may be 125 μm. In FIG. 7A, illustration of the external electrode 5 is omitted. FIG. 7B illustrates a cross section at a position that is ½ of the length of the element body 3. Therefore, the edge line surface 3j in FIG. 7B illustrates an edge line surface at a position that is ½ of the length of the element body 3.

When the multilayer capacitor 1 is a C1005 type product, the radius of curvature R1 of the corner portion 3k is 20 μm to 45 μm. When the multilayer capacitor 1 is a C1608 type product, the radius of curvature R1 of the corner portion 3k is 60 μm to 80 μm. When the multilayer capacitor 1 is a C2012 type product, the radius of curvature R1 of the corner portion 3k is 100 μm to 120 μm. When the multilayer capacitor 1 is a C3225 type product, the radius of curvature R1 of the corner portion 3k is 200 μm to 250 μm.

As described above, in the multilayer capacitor 1 according to the present embodiment, the connecting portions 7b and 9b of the internal electrodes 7 and 9 are positioned in the region corresponding to the end surface 3e when viewed from the direction perpendicular to the end surface 3e (the third direction D3). That is, the connecting portions 7b and 9b of the internal electrodes 7 and 9 are not positioned in the region corresponding to the edge line surface 3g or the edge line surface 3i when viewed from the direction perpendicular to the end surface 3e. Thereby, in the multilayer capacitor 1, entering of a plating solution into the element body 3 via the connecting portions 7b and 9b of the internal electrodes 7 and 9 can be suppressed in a plating process of forming the plated layer PL of the external electrode 5. Therefore, improvement in reliability can be achieved in the multilayer capacitor 1. On the other hand, in the multilayer capacitor 1, the electrode portions 7a and 9a of the internal electrodes 7 and 9 have portions overlapping a region of the intersecting portion (the corner portion 3k) of the edge line surface 3j and the edge line surface 3i when viewed from the direction perpendicular to the end surface 3e. Thereby, areas of the electrode portions 7a and 9a can be increased in the multilayer capacitor 1. Therefore, increase in capacitance can be achieved in the multilayer capacitor 1.

The multilayer capacitor 1 includes the edge line surface 3g and the edge line surface 3i formed on the element body 3. In this configuration, when the first electrode layer E1 is formed, a thickness of the first electrode layer E1 formed on the edge line surface 3g and the edge line surface 3i can be smaller than a thickness of the first electrode layer E1 formed on the end surface 3e. Therefore, in the plating process of forming the plated layer PL of the external electrode 5, entering of the plating solution is more likely to occur in the first electrode layer E1 disposed on the edge line surface 3g and the edge line surface 3i of the element body 3 than in the first electrode layer E1 disposed on the end surface 3e. Therefore, in the multilayer capacitor 1, the connecting portions 7b and 9b of the internal electrodes 7 and 9 are positioned in the region corresponding to the end surface 3e when viewed from the direction perpendicular to the end surface 3e. Thereby, in the multilayer capacitor 1, entering of the plating solution into the element body 3 via the connecting portions 7b and 9b of the internal electrodes 7 and 9 can be suppressed in the plating process of forming the plated layer PL of the external electrode 5.

In the multilayer capacitor 1 according to the present embodiment, the radius of curvature R1 of the corner portion 3k of the element body 3 is larger than the radius of curvature R2 of the edge line surface 3j. In this configuration, since the curvature of the corner portion 3k is made small in the element body 3, occurrence of chipping can be further suppressed.

In the multilayer capacitor 1 according to the present embodiment, all the connecting portions 7b and 9b of the plurality of internal electrodes 7 and 9 are positioned in the region corresponding to the end surface 3e when viewed from the direction perpendicular to the end surface 3e. In this configuration, all the connecting portions 7b and 9b are not positioned in the region corresponding to the edge line surface 3g or the edge line surface 3i when viewed from the direction perpendicular to the end surface 3e. Therefore, in the multilayer capacitor 1, entering of the plating solution into the element body 3 via any of the connecting portions 7b and 9b of the internal electrodes 7 and 9 can be further suppressed in the plating process of forming the plated layer PL of the external electrode 5.

In the multilayer capacitor 1 according to the present embodiment, the electrode portions 7a and 9a of the two internal electrodes 7 and 9 disposed at the end portions in the lamination direction of the plurality of internal electrodes 7 and 9 have portions overlapping the region of the intersecting portion (the corner portion 3k) of the edge line surface 3j and the edge line surface 3i at positions facing each other in the lamination direction. In this configuration, since the areas of the electrode portions 7a and 9a of the internal electrodes 7 and 9 can be increased, the capacitance can be increased.

In the multilayer capacitor 1 according to the present embodiment, the width W2 of the connecting portions 7b and 9b of the internal electrodes 7 and 9 is smaller than the width W1 of the electrode portions 7a and 9a. In this configuration, the capacitance can be increased while suppressing entering of the plating solution.

In the multilayer capacitor 1 according to the present embodiment, when viewed from the direction perpendicular to the end surface 3e, both end portions in a direction in which the pair of side surfaces 3c and 3c parallel to the lamination direction face each other (in the second direction D2) in the electrode portions 7a and 9a of the two internal electrodes 7 and 9 disposed at the end portions in the lamination direction of the plurality of internal electrodes 7 and 9 have portions overlapping the region of the intersecting portion (the corner portion 3k) of the edge line surface 3j and the edge line surface 3i. In this configuration, since the areas of the electrode portions 7a and 9a of the internal electrodes 7 and 9 can be increased, the capacitance can be increased.

In the multilayer capacitor 1 according to the present embodiment, when viewed from the direction perpendicular to the end surface 3e, central portions in the direction in which the pair of side surfaces 3c and 3c parallel to the lamination direction face each other (in the second direction D2) in the electrode portions 7a and 9a of the two internal electrodes 7 and 9 disposed at the end portions in the lamination direction of the plurality of internal electrodes 7 and 9 are positioned in the region corresponding to the end surface 3e. In this configuration, the capacitance can be increased while suppressing entering of the plating solution.

While a preferred embodiment of the present invention have been described above, the present invention is not necessarily limited to the above-described embodiment, and various modifications can be made without departing from the gist of the present invention.

In the above-described embodiment, as illustrated in FIG. 6A, a configuration in which all the connecting portions 7b of the internal electrodes 7 are positioned in the end surface 3e of the element body 3 has been described as an example. However, of the plurality of internal electrodes 7, some of the connecting portions 7b of the internal electrodes 7 may be positioned in the end surface 3e of the element body 3. That is, some of the connecting portions 7b of the internal electrodes 7 may be positioned at the region corresponding to the edge line surface 3g and/or the edge line surface 3i when viewed from the third direction D3. The same applies to the internal electrodes 9.

In the above-described embodiment, as illustrated in FIG. 6B, a configuration in which both end portions in the second direction D2 of the electrode portion 7a of the internal electrode 7 that is closest to one main surface 3a in the first direction D1 are positioned at the regions corresponding to the intersecting portion of the edge line surface 3j and the edge line surface 3i when viewed from the third direction D3 has been described as an example. However, all the electrode portions 7a of the internal electrodes 7 may be positioned at the region corresponding to the intersecting portion of the edge line surface 3j and the edge line surface 3i or to the edge line surface 3i when viewed from the third direction D3. The same applies to the internal electrode 9.

In the above-described embodiment, as illustrated in FIG. 5, a configuration in which the width W1 of the electrode portion 7a is larger than the width W2 of the connecting portion 7b in the internal electrode 7 has been described as an example. However, the width W1 of the electrode portion 7a and the width W2 of the connecting portion 7b may be the same as each other in the internal electrode 7. That is, the internal electrode 7 may have a rectangular shape as a whole. The same applies to the internal electrode 9.

In the above-described embodiment, a configuration in which the multilayer capacitor 1 includes four internal electrodes 7 and four internal electrodes 9 has been described as an example. However, the number of internal electrodes 7 and 9 may be appropriately set according to a design.

In the above-described embodiment, a configuration in which the electronic component is the multilayer capacitor 1 has been described as an example. However, the electronic component is not limited to a multilayer capacitor. Electronic components to which the present invention can be applied may be, for example, laminated electronic components such as laminated varistors, laminated piezoelectric actuators, laminated thermistors, or laminated composite components, or electronic components other than the laminated electronic components.

In the present specification, when it is described that an element is disposed on another element, the element may be directly disposed on another element or may be indirectly disposed on another element. When an element is indirectly disposed on another element, there is an intervening element between the element and another element. When one element is directly disposed on another element, there is no intervening element between the element and another element.

In the present specification, when it is described that an element is positioned on another element, the element may be directly positioned on another element or may be indirectly positioned on another element. When an element is indirectly positioned on another element, there is an intervening element between the element and another element. When one element is directly positioned on another element, there is no intervening element between the element and another element.

In the present specification, when it is described that an element covers another element, the element may directly cover another element or may indirectly cover another element. When an element indirectly covers another element, there is an intervening element between the element and another element. When one element directly covers another element, there is no intervening element between the element and another element.

What is claimed is:

1. An electronic component comprising:

an element body including a pair of end surfaces facing each other and four side surfaces connecting the pair of end surfaces;

an external electrode disposed on the side surfaces and each of the end surfaces; and a plurality of internal electrodes disposed in the element body, the internal electrodes being laminated between two end portions along a lamination direction, wherein the element body includes a first edge line surface which is provided between one or more of the end surfaces and each of the side surfaces and which is curved, and a second edge line surface which is provided between two adjacent side surfaces and which is curved, each of the external electrodes includes an electrode layer provided across the respective end surface and a part of one or more of the side surfaces and a plated layer covering the electrode layer, the plurality of internal electrodes each include an electrode portion disposed to face other internal electrodes and a connecting portion connecting the electrode portion and the respective external electrode, the connecting portions of the internal electrodes are positioned in a region corresponding to the respective end surface when viewed from a direction perpendicular to the respective end surface, the internal electrodes include first internal electrodes at the two end portions along the lamination direction and second internal electrodes at central portions between the two end portions along the lamination direction, the electrode portions of the first internal electrodes have portions overlapping a region corresponding to the first edge line surface when viewed from the direction perpendicular to the respective end surface, and the electrode portions of the second internal electrodes have no portions overlapping the region corresponding to the first edge line surface when viewed from the direction perpendicular to the respective end surface.

2. The electronic component according to claim 1, wherein a radius of curvature of a corner portion of the element body is larger than a radius of curvature of the second edge line surface.

3. The electronic component according to claim 1, wherein all the connecting portions of the plurality of internal electrodes are positioned in the region corresponding to the respective end surface when viewed from the direction perpendicular to the respective end surface.

4. The electronic component according to claim 1, wherein a width of the connecting portions is smaller than a width of the electrode portions.

* * * * *